United States Patent
Bhuiya et al.

(10) Patent No.: US 10,630,776 B2
(45) Date of Patent: Apr. 21, 2020

(54) HANDLING A SYSTEM BLOCKING CALL

(71) Applicant: International Business Machines Corporation, Armonk, NY (US)

(72) Inventors: Subhajit Bhuiya, Bangalore (IN); Vijay Ekambaram, Tamilnadu (IN); Ashwin M. Narvekar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

(21) Appl. No.: 15/405,441

(22) Filed: Jan. 13, 2017

(65) Prior Publication Data
US 2018/0205794 A1    Jul. 19, 2018

(51) Int. Cl.
*H04L 29/08* (2006.01)
*G06F 11/30* (2006.01)

(52) U.S. Cl.
CPC ............ *H04L 67/125* (2013.01); *G06F 11/30* (2013.01)

(58) Field of Classification Search
CPC ............................... H04L 67/125; G06F 11/30
USPC ........................................................ 709/224
See application file for complete search history.

(56) References Cited

U.S. PATENT DOCUMENTS

| | | | |
|---|---|---|---|
| 6,130,937 A * | 10/2000 | Fotta .................. | H04M 3/38 379/188 |
| 7,069,317 B1 * | 6/2006 | Colrain .............. | G06F 11/2025 709/224 |
| 7,461,263 B2 * | 12/2008 | Prince ................ | H04M 3/38 713/182 |
| 8,634,810 B2 | 1/2014 | Barkie et al. | |
| 8,707,201 B1 | 4/2014 | Aradhye et al. | |
| 9,002,380 B2 | 4/2015 | Sabatelli et al. | |
| 9,110,581 B2 | 8/2015 | Momchilov | |
| 9,154,606 B2 | 10/2015 | Tseng et al. | |
| 2002/0124106 A1 * | 9/2002 | Dolganow .......... | H04L 47/746 709/242 |
| 2006/0136789 A1 * | 6/2006 | Oshida ............... | G06F 11/0745 714/43 |
| 2006/0293057 A1 * | 12/2006 | Mazerski ............ | H04M 3/38 455/445 |

FOREIGN PATENT DOCUMENTS

WO     2014073825 A1    5/2014

* cited by examiner

*Primary Examiner* — Brian Whipple
*Assistant Examiner* — John Fan
(74) *Attorney, Agent, or Firm* — Law Offices of Ira D. Blecker, P.C.

(57) ABSTRACT

Handling a system blocking call which includes: registering a first computer device with a second computer device having a monitoring application, the monitoring application monitoring operations on the second computer including a blocking call wherein the blocking call is an operation that has stalled while waiting for input from a user of the first computer device; responsive to the blocking call on the second computer device, notifying the first computer device of the blocking call; receiving by the second computer device an input from the first computer device responsive to the blocking call; analyzing by the monitoring application the input; and processing by the second computer device the input to resolve the blocking call.

20 Claims, 6 Drawing Sheets

HANDLING A SYSTEM BLOCKING CALL

BACKGROUND

The present exemplary embodiments pertain to a computer system which may need attention from time to time and, more particularly, pertain to handling a system blocking call while a user of the computer system is not present at the computer system.

When a computer system undergoes a time consuming operation, the computer system may, and often does, ask for some user input. When the computer system asks for the input, the computer system may display a notification to the user on the display of the computer system. If a user is not present when such a notification is displayed, the whole operation of the computer may be blocked from performing further operations. The operation of the computer system may be blocked unless the user provides the input or does an action as suggested by the computer system.

Some operations may take many minutes or even several hours and the user never knows when the computer system will display an input request. Accordingly, the user is essentially tied to the computer until the time-consuming operation is completed.

Some common time-consuming operations may include, but not be limited to, copying a large folder from one computer system to another computer system, installing or updating software or deleting a large folder. Each of these operations may notify the user to close some open application or restart the computer. If the user is not present to provide the requested input, the computer system may simply wait until the user returns.

For long running operations, it may not be possible for the user to monitor the computer system all of the time. The user may start the operation and move to another location to start another assignment while the computer system is undergoing the operation. But if the operation asks for user input before the user returns, then the whole process will get stuck at that point, resulting in a waste of man power and resource.

BRIEF SUMMARY

The various advantages and purposes of the exemplary embodiments as described above and hereafter are achieved by providing, according to an aspect of the exemplary embodiments, a method of handling a system blocking call comprising: registering a first computer device with a second computer device having a monitoring application, the monitoring application (1) monitoring operations on the second computer including a blocking call wherein the blocking call is an operation that has stalled while waiting for input from a user of the first computer device, (2) notifying the first computer device that a blocking call has occurred and (3) analyzing any input from the first computer device responsive to the notifying the first computer device; monitoring by the monitoring application for the blocking call on the second computer device; responsive to the blocking call on the second computer device, notifying the first computer device of the blocking call; receiving by the second computer device an input from the first computer device responsive to the blocking call; analyzing by the monitoring application the input; and processing by the second computer device the input to resolve the blocking call.

According to another aspect of the exemplary embodiments, there is provided a system for handling a system blocking call comprising: a computer readable storage medium; and a processor that executes the instructions to perform the following functions: register a first computer device with a second computer device having a monitoring application, the monitoring application (1) monitors operations on the second computer including a blocking call wherein the blocking call is an operation that has stalled while waiting for input from a user of the first computer device, (2) notifies the first computer device that a blocking call has occurred and (3) analyzes any input from the first computer device responsive to the notifies the first computer device; monitor by the monitoring application for the blocking call on the second computer device; responsive to the blocking call on the second computer device, notify the first computer device of the blocking call; receive by the second computer device an input from the first computer device responsive to the blocking call; analyze by the monitoring application the input; and process by the second computer device the input to resolve the blocking call.

According to a further aspect of the exemplary embodiments, there is provided a computer program product for handling a system blocking call, the computer program product comprising a computer readable storage medium having program instructions embodied therewith, the program instructions executable by a processor to cause the processor to perform a method comprising: registering a first computer device with a second computer device having a monitoring application, the monitoring application (1) monitoring operations on the second computer including a blocking call wherein the blocking call is an operation that has stalled while waiting for input from a user of the first computer device, (2) notifying the first computer device that a blocking call has occurred and (3) analyzing any input from the first computer device responsive to the notifying the first computer device; monitoring by the monitoring application for the blocking call on the second computer device; responsive to the blocking call on the second computer device, notifying the first computer device of the blocking call; receiving by the second computer device an input from the first computer device responsive to the blocking call; analyzing by the monitoring application the input; and processing by the second computer device the input to resolve the blocking call.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
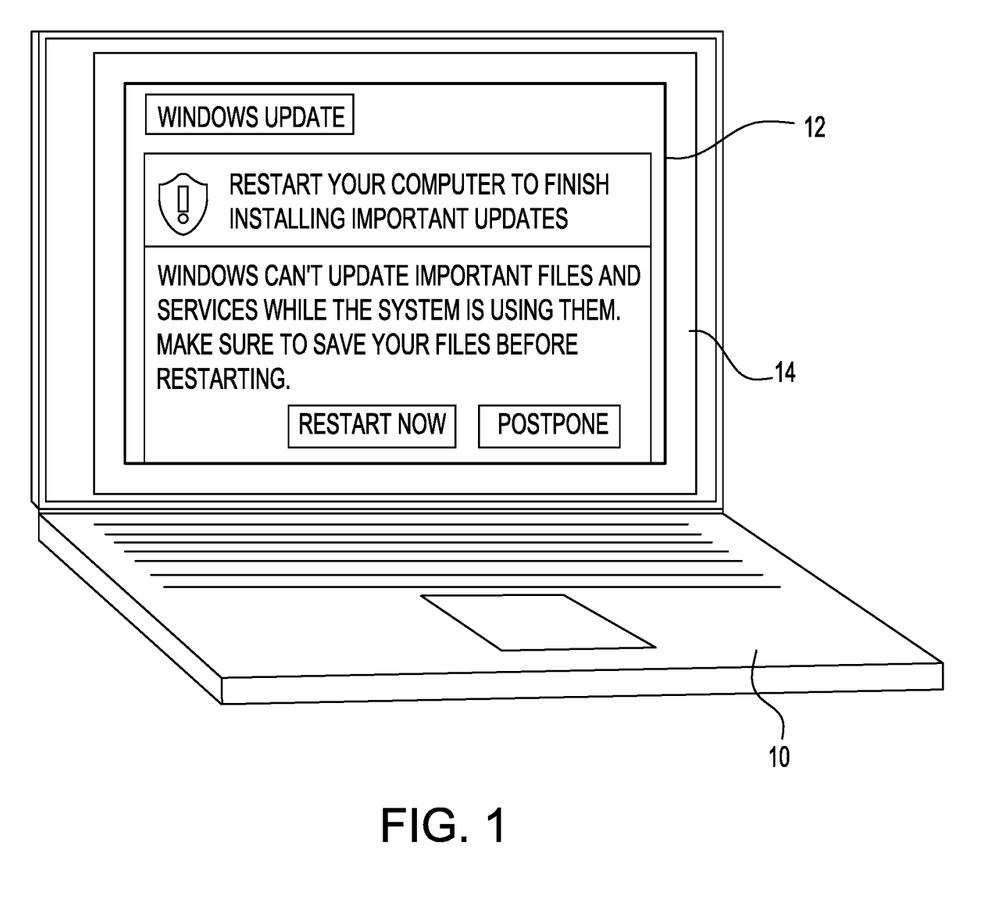
FIG. 1 is an illustration of a computer device experiencing a blocking call.

Referring now to the Figures in more detail, and particularly referring to FIG. 1, there is shown a situation typical of the problem that the present application addresses. A computer device 10, such as a laptop but could be a number of other computer devices such as but not limited to a desktop computer, workstation, server or mainframe, is undergoing an operation. For the purpose of illustration and not limitation, this operation may be installing updates. Before the installation of updates may be completed, it is necessary to restart the computer device 10. The computer device 10 may display a notification 12 on the computer device's display 14 that a restart of the computer device 10 is required. A user is required to press the "restart now" button or the "postpone" button to continue. However, a user must be present to press either of the buttons. If the user is not present, the computer device 10 will wait until the user returns and presses either of the buttons.

The notification 12 to the user may be referred to hereafter as a system blocking call as the system on the computer device 10 is blocked from proceeding further until a response to the notification 12 is received by the computer device 10.

To alleviate the problem of the system blocking call, the present inventors have proposed a method, system and computer program product for monitoring system blocking calls of an operation in the computer device 10, sending the corresponding system blocking calls to a user active mobile device, if the user is not responding in a timely manner, and showing the system blocking calls in the mobile device in a user friendly way. An option is provided for user input along with sending user input information to the computer device 10 which is then processed by the monitoring application running on the computer device 10 to unblock the operation.

Figure 2A:
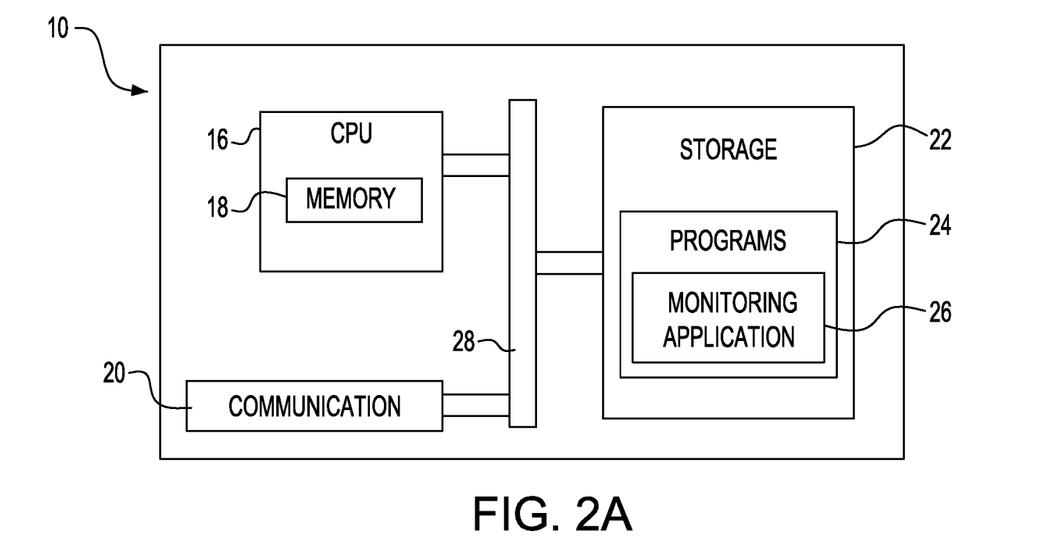
FIG. 2A is an illustration of a computer device having a monitoring application for monitoring blocking calls and FIG. 2B is an illustration of a mobile computer device having a mobile monitoring application for responding to the blocking calls.
Figure 2B:
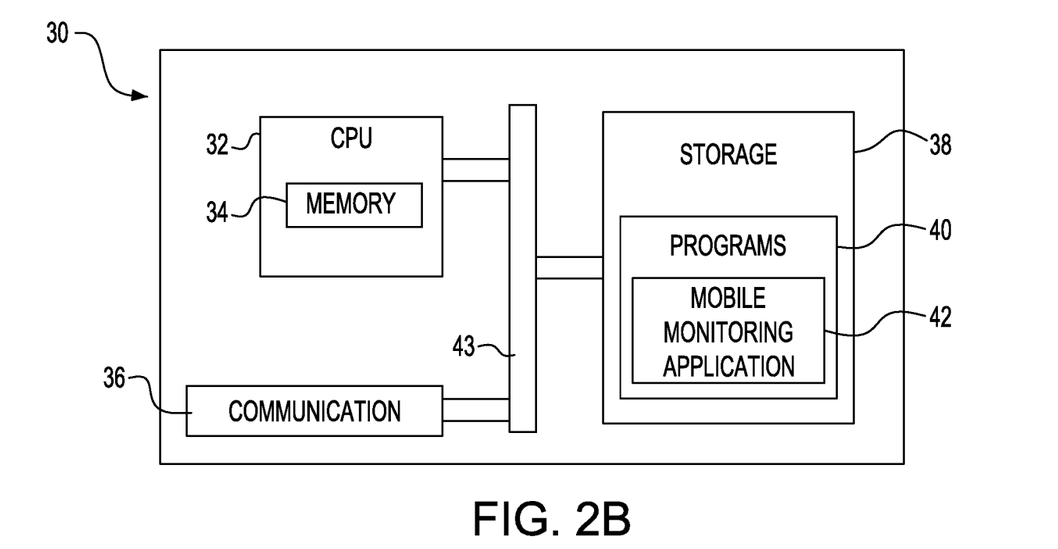

Referring now to FIGS. 2A and 2B, there are illustrated block diagrams for a computer device 10 in FIG. 2A and a mobile device 30 in FIG. 2B. Referring first to FIG. 2A, computer device 10 may have a central processing unit (CPU) 16 having memory 18. Computer device 10 may have a communication capability 20 such as WiFi, cellular, satellite, Bluetooth® short range radio and near field communication. In addition, computer device 10 may have storage 22 such as disk storage and/or solid state storage. Located within storage 22 or otherwise accessible by computer device 10 may be computer programs 24, one of which is a monitoring application 26 to register the mobile device 30, monitor a system blocking call, provide a notification to the mobile device 30, receive input from the mobile device 30 and other functions to be explained hereafter. A bus 28 may be present in computer device 10 to provide a connection between all components in the computer device 10. It should be understood that computer device 10 may have other components not germane to the exemplary embodiments.

Referring now to FIG. 2B, mobile device 30 may be any portable device such as a mobile phone, tablet or even a laptop. The mobile device 30 may have a CPU 32, memory 34 and communication capability 36 similar to the computer device 10. In addition, mobile device 30 may have storage 38, such as disk storage and/or solid state storage, and programs 40 located within storage 38 or otherwise accessible by the mobile device 30. One of the programs 40 may be a mobile monitoring application 42 to work with the computer device 10 to register the mobile device 30, receive the notifications from the computer device 10, act on the notifications and other functions to be explained hereafter. A bus 43 may be present in mobile device 30 to provide a connection between all components in the mobile device 30. It should be understood that mobile device 30 may have other components not germane to the exemplary embodiments.

Figure 3:
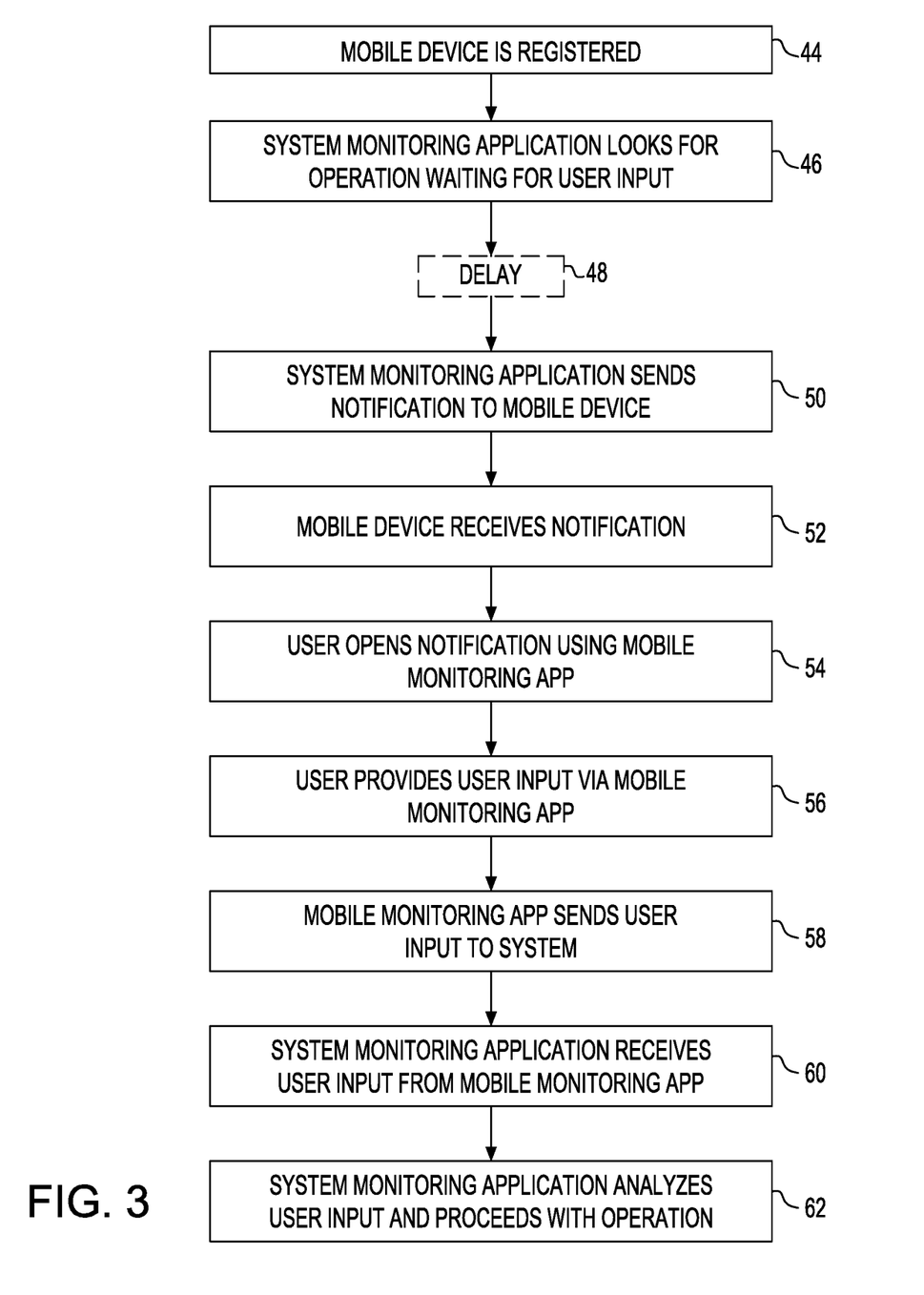
FIG. 3 is a flow chart for the exemplary embodiments.

FIG. 3 depicts a flow chart for the exemplary embodiments and FIGS. 4 to 7 depict specific steps corresponding to steps in the flow chart. In the following discussion, FIG. 3 may be referenced simultaneously with FIGS. 4 to 7.

Figure 4:
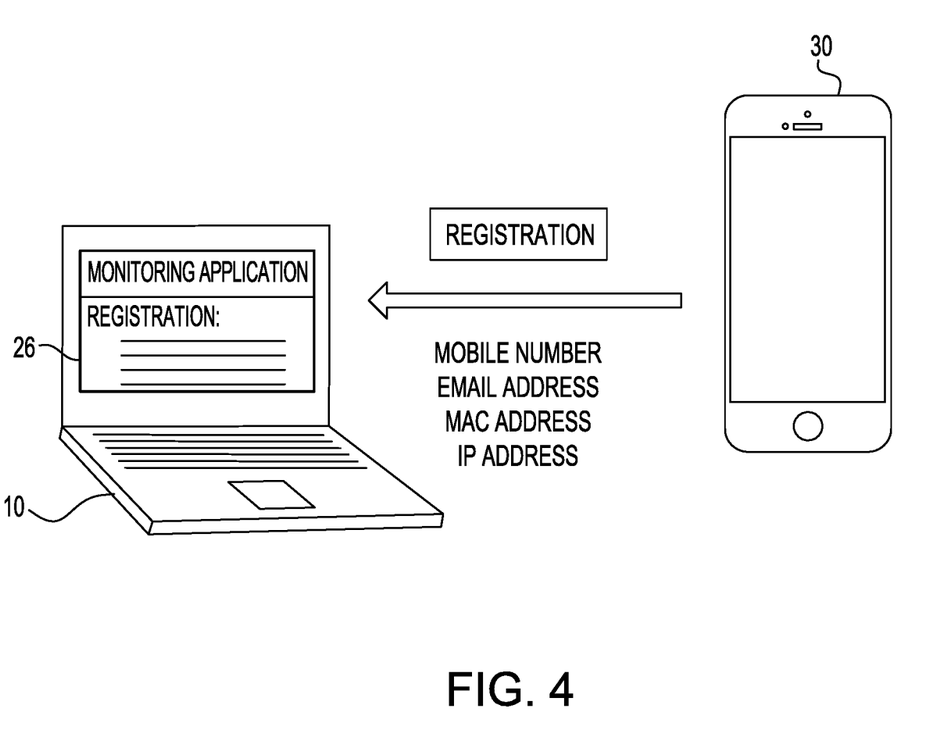
FIG. 4 is an illustration of a mobile computer device registering with the computer device.

In a first step of the exemplary embodiments, the mobile device 30 is registered, box 44, with the computer device 10. Referring to FIG. 4, the user registers the mobile device 30 with the computer device 10. If the user has more than one mobile device, other mobile devices may also be registered with the computer device 10.

As shown in FIG. 4, the monitoring application 26 is opened in the computer device 10. The mobile device 30 needs to be registered with the computer device 10. Registration of the mobile device 30 may occur by a number of different ways. If the mobile device 30 is a mobile phone, registration may occur by providing the mobile number of the mobile phone to the computer device 10. If the mobile device 30 is a tablet or laptop, registration may occur by other means such as providing an email address, MAC address or IP address to the computer device 10. In essence, registration requires a means by which the computer device 10 may provide the notification to the mobile device 30. □

After the mobile device 30 has been registered with the computer device 10, mobile device 30 may periodically send some user input to the computer device 10 so that the computer device 10 knows which mobile device 30, if there is more than one mobile device, is active. Alternatively, the computer device 10 may simply send the notification to all registered mobile devices 30.

If the mobile monitoring application 42 is more sophisticated, the mobile monitoring application (hereafter just "app") 42 in the mobile device 30 may monitor various events that may occur in the mobile device 30. The computer device 10 through monitoring application 26 in the computer device 10 and mobile monitoring app 42 in the mobile device 30 also monitors the mobile device 30 in which the user is currently active and the best communication channel to reach the mobile device 30.

Again, if the mobile monitoring app 42 is more sophisticated, the mobile monitoring app 42 in the mobile device 30 will stream, periodically or continuously, user interaction data to the computer device 10 which helps in discovering the active current mobile device, such as mobile device 30, which is reachable by the computer device 10. User interaction data is simply user data that the user inputs to the mobile device 30. The mobile monitoring app 42 in the mobile device 30 further may stream network status to the computer device 10 which helps in discovering the best communication channel, such as text, Internet, WiFi, Bluetooth short range radio, etc., to reach the mobile device 30.

In a next step, the monitoring application 26 in the computer device 10 looks for an operation waiting for user input, box 46. The monitoring application 26, which may run at the operating system (OS) level, keeps on checking if any operation is blocked while waiting for user input. The monitoring application 26 can detect the system blocking call by checking if the call is a blocking thread call or a pop up window has come up which needs input from a dialog such as "Yes-No" dialog, "Ok" dialog, "Restart" dialog etc. Such a dialog was illustrated in FIG. 1 where system blocking call Windows Update 12 was waiting for user input.

Thereafter, the monitoring application 26 in the computer device 10 sends a notification to the registered mobile device 30, box 50, and the mobile device 30 receives the notification, box 52. There may be instituted an optional preconfigured delay, box 48, of a few minutes, for example, before actually sending the notification to the mobile device 30 to avoid unnecessarily alarming the mobile device user. During this delay, the user, if positioned at the computer device 10, may provide the requested input to the computer device 10 without actually sending the notification to the mobile device 30.

Figure 5:
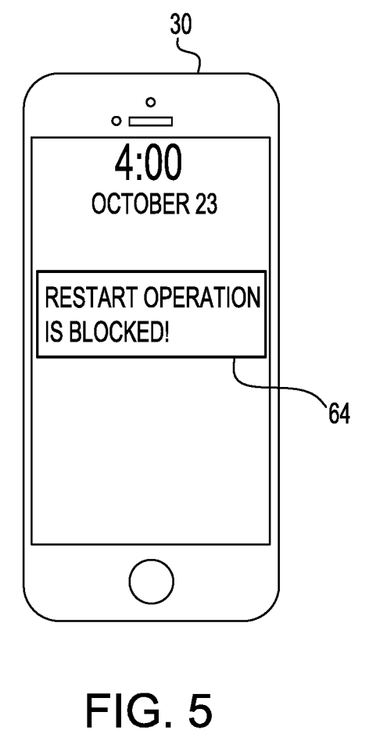
FIG. 5 is an illustration of a mobile computer device receiving a blocking call notification from the computer device.

Referring to FIG. 5, the mobile device 30 has displayed the notification 64 "Restart operation is blocked!" sent from the monitoring application 26. The notification 64 may be displayed on the mobile device 30 the same as any other notification that the mobile device 30 may receive if the mobile device 30 is a mobile phone. If the mobile device 30 is, for example, a laptop or tablet, the notification 64 may be provided to the laptop or tablet by an email or other type of communication since the computer device 10 knows the email address, MAC address or IP address of the laptop or tablet.

Figure 6:
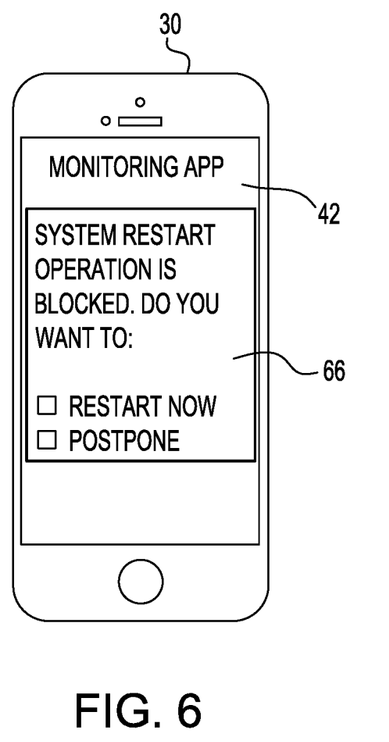
FIG. 6 is an illustration of the mobile monitoring app opening the blocking call notification on the mobile computer device.
Figure 7:
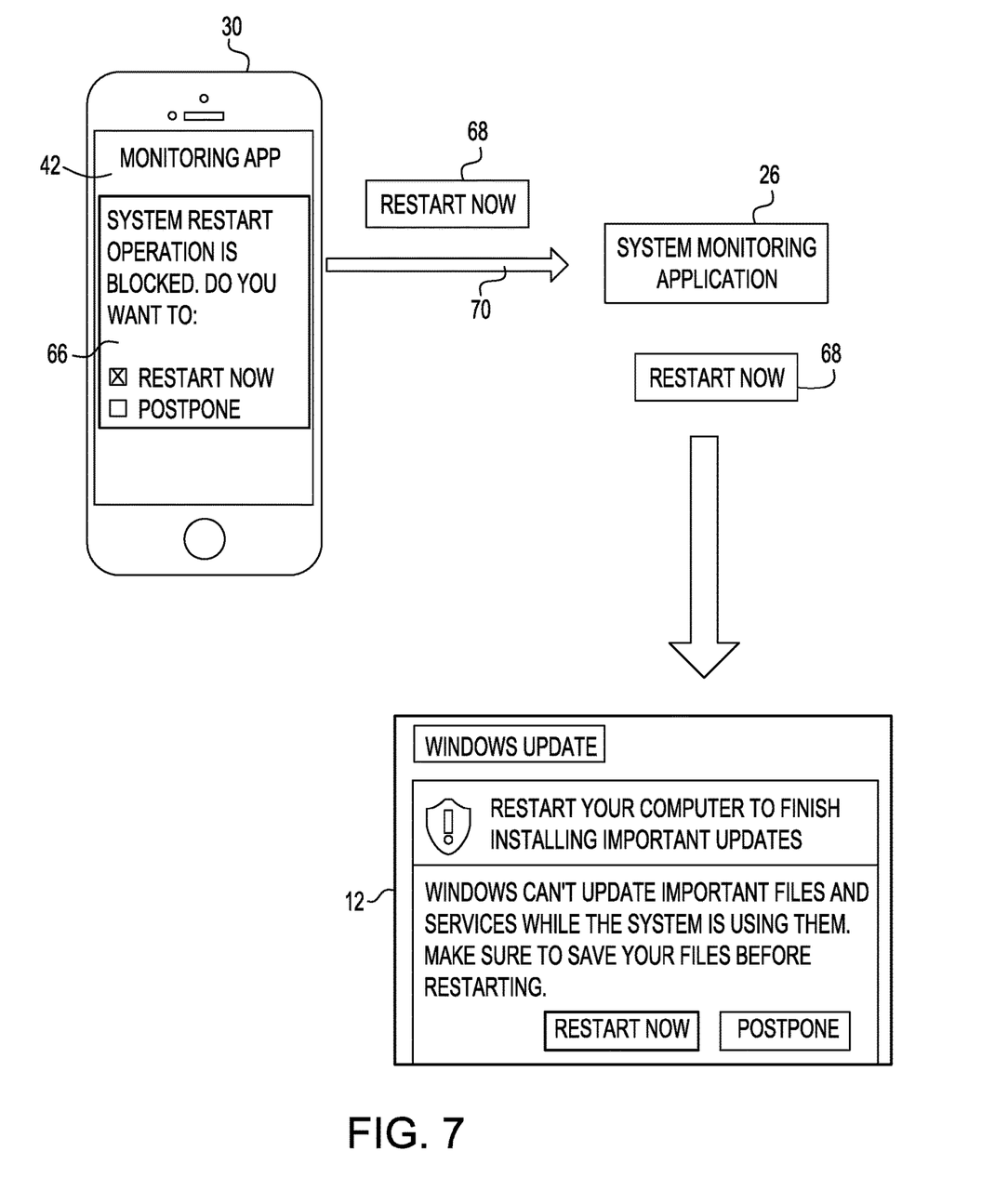
FIG. 7 is an illustration of the mobile computer device responding to the blocking call notification by using the mobile monitoring app, sending input to the computer device and the monitoring program on the computer device analyzing and processing the input from the mobile computer device.

The user may open the notification 64 using the mobile monitoring app 42 in the mobile device 30, box 54. Referring to FIG. 6, the notification 64 has been opened in the mobile monitoring app 42. The mobile monitoring app 42 processes the notification 64 and presents the notification in a more informative and user friendly way and asks the user for user input. The processed notification 64 now appears on mobile device 30 as notification 66. The user has the options to "Restart now" or "Postpone", just as if the user was looking at system blocking call Windows Update 12 in FIG. 1. The text in notification 66 may be configured to be exactly like the text in the system blocking call or may be configured to convey the substance of the system blocking call in a more user friendly way as shown in FIGS. 6 and 7.

The user provides user input via notification 66 of the mobile monitoring app 42 in the mobile device 30, box 56. Referring now to FIG. 7, the user provides the input requested by the mobile monitoring app 42. As shown in FIG. 7, the user has marked the box "Restart now".

The mobile monitoring app 42 in the mobile device 30 sends the user input to the computer device 10, box 58. Referring again to FIG. 7, the user input "Restart now" 68, is sent, as indicated by arrow 70, to computer device 10 by any of the communication capabilities in mobile device 30.

The monitoring application 26 in the computer device 10, while waiting for input from the user, receives the user input from the mobile monitoring app 42 in the mobile device 30, box 60. Referring again to FIG. 7, the monitoring application 26 receives the user input "Restart now" 68 from the mobile monitoring app 42.

The monitoring application 26 in the computer device 10 analyzes the user input and proceeds with the operation, box 62. Based on the user input, the monitoring application 26 decides which action to perform and proceeds with the operation. Thus, as shown in FIG. 7, the monitoring application 26 understands the user input "Restart now" 68 and proceeds to restart computer device 10. The computer device 10 may visually display the system blocking call Windows Update 12 from FIG. 1 with the "Restart now" button highlighted as shown in FIG. 7 to indicate that the operation "Restart now" has been selected.

While the above description of the monitoring application 26 in the computer device 10 has indicated the monitoring application 26 to be at the OS level, this does not always need to be the case. There may be instances such as updates to commercially available software application where the monitoring application 26 may be bundled with the commercially available software application instead of at the OS level.

It should be understood that while the exemplary embodiments have used a mobile device as an exemplary embodiment, it should be understood that the exemplary embodiments may apply to any devices using the system monitoring tools as described herein.

The exemplary embodiments of the computer device 10 and mobile device 30 work in a loosely coupled manner through simple message transfers without any end-to-end session maintenance. Thus, the exemplary embodiments do not create any remote-desktop connection sessions across devices. In summary, an operation gets blocked in computer device 10 and the computer device 10 creates a message specifying the blocking call. The computer device discovers or knows the mobile device 30 on which the user is active. Since the mobile device 30 is known to the computer device 10, the message get passed from computer device 10 to mobile device 30. It should be noted that there is no remote desktop connection or remote access between these computer device 10 and mobile device 30. The mobile device 30 receives the message and responds to it by inputting a response and sending the response to the computer device 10. The computer device 10 receives the response from the mobile device 30 and injects it into the event bus to continue the operation that was blocked. Message transfer between computer device 10 and mobile device 30 may happen through SMS or IP address or internet network etc. based on the mode through which the user is accessible at that point.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of handling a system blocking call comprising:
 registering a first computer device with a second computer device having a monitoring application, the monitoring application (1) monitoring operations on the second computer including a blocking call wherein the blocking call is an operation of the second computer device that has stalled while waiting for input from a user of the first computer device, wherein being stalled for the second computer device is that the second computer device is blocked from proceeding with the operation until input is received from the user, (2) directly notifying the registered first computer device that a blocking call has occurred and (3) analyzing any input from the registered first computer device responsive to the notifying the registered first computer device;
 monitoring by the monitoring application for the blocking call on the second computer device;

responsive to the blocking call on the second computer device, directly notifying the registered first computer device of the blocking call;

directly receiving by the second computer device an input from the registered first computer device responsive to the blocking call while the second computer device has stalled;

analyzing by the monitoring application the input; and processing by the second computer device the input to resolve the blocking call.

2. The method of claim 1 wherein responsive to the blocking call on the second computer device, delaying notifying the registered first computer device of the blocking call for a predefined period of time.

3. The method of claim 1 wherein the registered first computer device is a first mobile device.

4. The method of claim 3 wherein the first mobile device is a mobile phone and the second computer device is a laptop, desktop computer, server or mainframe computer.

5. The method of claim 3 wherein the first mobile device is a laptop computer or a tablet and the second computer device is a laptop computer, desktop computer, server or a mainframe computer.

6. The method of claim 3 further comprising registering a second mobile device with the monitoring application; and monitoring by the monitoring application the first mobile device or the second mobile device on which the user is currently active.

7. The method of claim 3 further comprising:
registering the first mobile device with the second computer device;
processing the notifying by a mobile application on the first mobile device; and
directly providing the input to the second computer device by the mobile application on the first mobile device.

8. The method of claim 7 further comprising reporting a network status of the first mobile device; and
responsive to receiving the network status by the monitoring application, the monitoring application choosing a communication channel for providing the notifying to the first mobile device.

9. A system for handling a system blocking call comprising:
a computer readable storage medium; and
a processor that executes the instructions to perform the following functions:
register a first computer device with a second computer device having a monitoring application, the monitoring application (1) monitors operations on the second computer including a blocking call wherein the blocking call is an operation of the second computer device that has stalled while waiting for input from a user of the first computer device, wherein being stalled for the second computer device is that the second computer device is blocked from proceeding with the operation until input is received from the user, (2) directly notifies the registered first computer device that a blocking call has occurred and (3) analyzes any input from the registered first computer device responsive to the notifies the registered first computer device;
monitor by the monitoring application for the blocking call on the second computer device;
responsive to the blocking call on the second computer device, directly notify the registered first computer device of the blocking call;

directly receive by the second computer device an input from the registered first computer device responsive to the blocking call while the second computer device has stalled;

analyze by the monitoring application the input; and process by the second computer device the input to resolve the blocking call.

10. The system of claim 9 wherein responsive to the blocking call on the second computer device, delay the notify the registered first computer device of the blocking call for a predefined period of time.

11. The system of claim 9 wherein the registered first computer device is a first mobile device.

12. The system of claim 11 wherein the first mobile device is a mobile phone, a laptop computer or a tablet and the second computer device is a laptop, desktop computer or mainframe computer.

13. The system of claim 11 wherein the processor that executes the instructions to perform the following functions further comprising register a second mobile device with the monitoring application; and
monitor by the monitoring application the first mobile device or the second mobile device on which the user is currently active.

14. The system of claim 11 wherein the processor that executes the instructions to perform the following functions further comprising:
register the first mobile device with the second computer device;
process the notify by a mobile application on the first mobile device; and
provide the input to the second computer device by the mobile application on the first mobile device.

15. The system of claim 14 wherein the processor that executes the instructions to perform the following functions further comprising report a network status of the first mobile device; and
responsive to receive the network status by the monitoring application, the monitoring application chooses a communication channel to provide the notify to the first mobile device.

16. A computer program product for handling a system blocking call, the computer program product comprising a non-transitory computer readable storage medium having program instructions embodied therewith, the program instructions executable by a processor to cause the processor to perform a method comprising:
registering a first computer device with a second computer device having a monitoring application, the monitoring application (1) monitoring operations on the second computer including a blocking call wherein the blocking call is an operation of the second computer device that has stalled while waiting for input from a user of the first computer device, wherein being stalled for the second computer device is that the second computer device is blocked from proceeding with the operation until input is received from the user, (2) directly notifying the registered first computer device that a blocking call has occurred and (3) analyzing any input from the registered first computer device responsive to the notifying the registered first computer device;
monitoring by the monitoring application for the blocking call on the second computer device;
responsive to the blocking call on the second computer device, directly notifying the registered first computer device of the blocking call;

directly receiving by the second computer device an input from the registered first computer device responsive to the blocking call while the second computer device has stalled;

analyzing by the monitoring application the input; and processing by the second computer device the input to resolve the blocking call.

17. The computer program product of claim 16 wherein the registered first computer device is a first mobile device.

18. The computer program product of claim 17 further comprising registering a second mobile device with the monitoring application; and monitoring by the monitoring application the first mobile device or the second mobile device on which the user is currently active.

19. The computer program product of claim 17 further comprising:

registering the first mobile device with the second computer device;

processing the notifying by a mobile application on the first mobile device; and providing the input to the second computer device by the mobile application on the first mobile device.

20. The computer program product of claim 19 further comprising reporting a network status of the first mobile device; and responsive to receiving the network status by the monitoring application, the monitoring application choosing a communication channel for providing the notifying to the first mobile device.

* * * * *